Sept. 10, 1929.　　　W. A. DUERR　　　1,728,046
APPARATUS FOR SEPARATION OF SOLIDS
Filed July 21, 1927
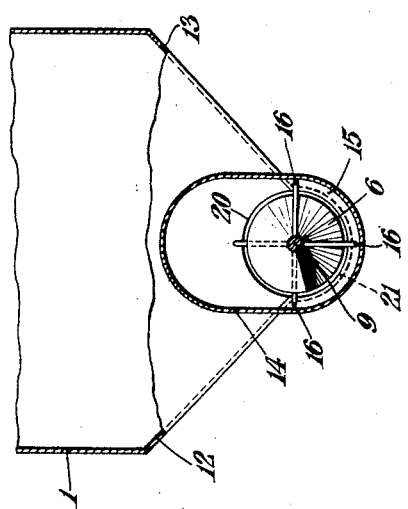
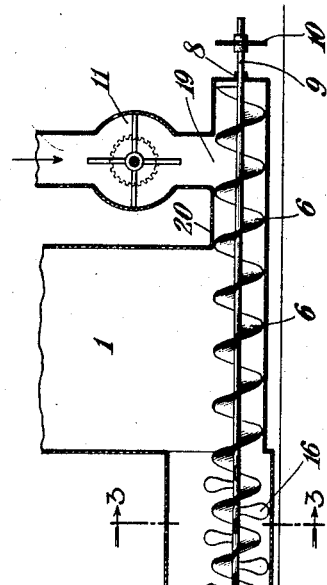
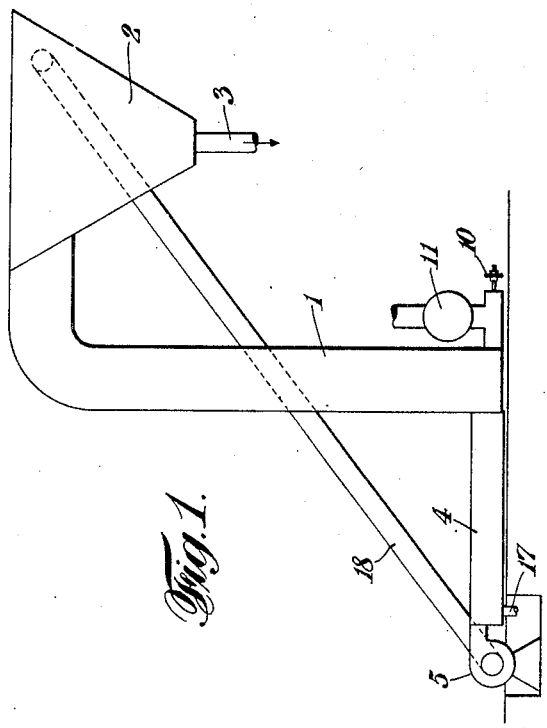
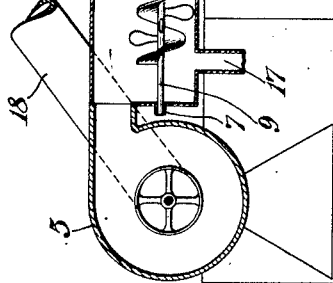

Patented Sept. 10, 1929.

1,728,046

UNITED STATES PATENT OFFICE.

WINSLOW A. DUERR, OF BRECKENRIDGE, TEXAS, ASSIGNOR TO CABOT CO., OF BOSTON, MASSACHUSETTS, A CORPORATION OF MASSACHUSETTS.

APPARATUS FOR SEPARATION OF SOLIDS.

Application filed July 21, 1927. Serial No. 207,367.

This invention relates to an apparatus for the classification and separation of mixtures of solid particles of different size but the same specific gravity, or of different specific gravities. The disclosure of the invention will, for convenience, be made in connection with the separation of grit particles from raw carbon black which has been produced in the form of a powder by combustion processes.

In the manufacture of carbon black, it has been found that small particles of gritty material are produced in the combustion processes by which the carbon is precipitated which seriously impair the usefulness of the finished product, particularly when used in the manufacture of rubber, ink or paint.

Heretofore it has been sought to purify raw carbon black by the use of screening and bolting machines, involving the passing of the carbon black, containing gritty impurities, on a current of air through fine-mesh metal screens or woven cloth materials of various degrees of fineness often with the aid of brushing or other mechanical assistance. Such methods have been uniformly unsatisfactory in that the screens or bolts tend to become clogged and the system must be frequently shut down for purposes of cleaning. Another disadvantage has been the fact that a breakage in the screen results immediately in a contamination of the product so that a considerable portion of the product must be rerun through a new screen or bolting cloth.

Among the many advantages of the apparatus which is the subject of the present invention is the fact that it produces a product highly uniform in character over long periods of time without shutting down the machinery. Furthermore, there is freedom from clogging, since screens or bolting cloths are not used. Another and important advantage of the present invention is that a breakdown of the moving parts of the apparatus does not result in contamination of the product earlier produced.

Referring to Figure 1 of the drawings which form a part of this specification, my apparatus consists of a separating tower 1 which at its top connects with a settling chamber 2 in which the purified product is deposited. The latter is provided with suitable means 3 for the removal of the purified product. Adjoining the separating tower, and opening into the base thereof, is a scrubber 4, a section of which is shown in detail in Figure 2 of the drawings. At one end of the scrubber is placed an air blower 5 adapted to force a current of air through the scrubber and into the base of the separating tower.

In Figure 2 of the drawings, the scrubber and the base of the separating tower are shown in detail with the covers cut away to show the helical conveyor screw 6 adapted to rotate within the scrubber and the base of the separating tower. The shaft 9, upon which the helical conveyor screw 6 is mounted, is supported by a bearing 7 at the end of the scrubber nearest to the air blower 5 and also by the bearing 8 through which it passes. Upon this shaft 9 is mounted a pinion wheel 10 by which the shaft and screw conveyor may be rotated. A rotary feeding device 11 is provided by means of which raw carbon black containing gritty impurities is fed to the screw conveyor 6 at the point 19.

The direction of rotation of the screw conveyor 6 is such as to move the mass of raw carbon black containing gritty impurities from right to left, as shown in Figure 2, and thus to transport the same into the base of the separating tower 1. Further rotation of the helical screw conveyor tends to move the mass of material from the separating tower 1 into the scrubber 4.

Into the scrubber 4 a current of air is forced by the blower 5 in such way that the direction of flow of the air current in the scrubber 4 is from left to right as viewed in Figure 2 of the drawings annexed hereto. This current of air, after passing the length of the scrubber, enters the base of the separating tower 1 and ascends therein, passing ultimately into the settling chamber 2. As the mass of powdery material is carried across the base of the separating tower and into the scrubber by the helical screw conveyor 6, it meets this current of air produced by the blower 5 and a portion of the powder containing the gritty impurities is carried into suspension in this current of air and with it moves upwardly in the separating tower 1. Most of the mass of raw carbon black containing the gritty impurities, however, is moved into the scrubber by the action of the helical screw conveyor.

The base of the separating tower 1 contains a trough 21 in which the helical screw conveyor 6 operates, as shown in Figure 3. Above this trough, the tower is provided with sloping sides 12 and 13 adapted to ensure the return to the helical screw conveyor of particles falling downwardly in the separating tower. The blade 6 of the screw conveyor is adapted to make substantial or near contact with the inner surface of the trough in order that no substantial quantity of powdery material may become entrapped between the inner surface of this trough and the sphere of operation of the blade of the screw conveyor.

The scrubber is itself in cross-section a covered trough (as shown at 14 in Figure 3) in which the screw conveyor is longitudinally disposed. The screw conveyor is, however, not adapted to make substantial or near contact with the inner surface of the scrubber, but a substantial space is left as shown at 15 in Figure 3. Affixed to the shaft 9 on which the blade 6 of the helical screw conveyor is mounted, and on that portion thereof which lies within the scrubber 4, are mounted a succession of paddles or arms 16 intermediate the successive turns of the blade 6 of the helical screw conveyor. These arms are somewhat longer than the radius of the blade 6 of the screw conveyor, so that the ends of these arms extend outside of the sphere of operation of the blade 6. The length of these arms 16 is so adjusted as to make substantial or near contact with the inner surface of the scrubber 4.

A vent 17 is provided for the rejection of separated gritty material and a return pipe 18 is provided through which air may be returned from the settling chamber 2 to the blower 5.

The operation of the apparatus is as follows: Raw carbon black containing gritty impurities is passed through the feeding device 11 to the helical screw conveyor 6 at the point 19. The material is moved from right to left, as viewed in Figure 2, and thus brought into the trough which constitutes the base of the separating tower 1. In so doing, the material is passed through a short section of piping 20 in which the blade 6 of the helical screw conveyor makes a sufficiently air-tight contact with the walls of the pipe 20 to prevent, in conjunction with the rotary feeding device 11, a leakage of air pressure. Further rotation of the helical screw conveyor passes the mass of powdery material into the scrubber 4. In the scrubber, the arms 16 tend to throw the powder into the current of air passing through the upper portion of the scrubber in a direction from left to right as viewed in Figure 2. This current of air, upon emerging from the scrubber into the base of the separating tower, is heavily laden with powdery material held in a state of suspension and to a certain extent the gritty impurities are likewise carried along by the air current. A current of air moving upwardly in the separating tower is produced as a result of the inflow of air at the base of the tower from the scrubber, and this ascending body of air carries in suspension the fine particles of carbon black. The tower is adjusted to such a height, and the rate of upward motion of the body of air in the tower is adjusted in such way, that all the gritty impurities in the carbon black settle downward by gravity in the separating tower against the upward current of air and fall back into the trough at the base thereof containing the rotating screw conveyor. The height of the tower and the speed of the air current depend entirely upon the size and weight of the grit particles occurring in the raw carbon black and may reasonably be left to adaptation in the particular case.

As the operation of the apparatus proceeds, the helical screw conveyor tends to transport the gritty refuse material toward the end of the scrubber nearest the blower 5 and ultimately the grit particles are rejected through the vent 17. The fine carbon black powder, entirely relieved of gritty impurities, is carried over into the settling chamber 2 and there allowed to separate from the air by gravitation or by any other means.

While I have described the application of my invention to an apparatus for the separation of gritty particles from carbon black, it is my conception that the scope of the invention is such that with minor modifications, it may be adapted to the separation of any finely divided solid from a mixture thereof with another finely divided solid whose particles are of different size or weight, or to the classification of mixtures of any solid materials which are light enough to be susceptible of upward-current air classification. It is not my intent, therefore, that this invention be limited to the specific disclosures made herein, but rather that it be regarded as having the scope indicated in the claim appended below.

I claim:

In a device of the character described, a tubular chamber, a blower discharging into one end of said chamber, a hopper discharging into the other end of said chamber, a separator communicating with said tubular chamber adjacent said hopper and a screw conveyor in said chamber extending from below said hopper across the mouth of said separator and terminating adjacent said blower.

In testimony whereof, I have signed my name to this specification.

WINSLOW A. DUERR.